Aug. 5, 1947.  G. C. LARSON  2,425,102
RADIANT-ENERGY RECEIVER
Filed Sept. 20, 1943
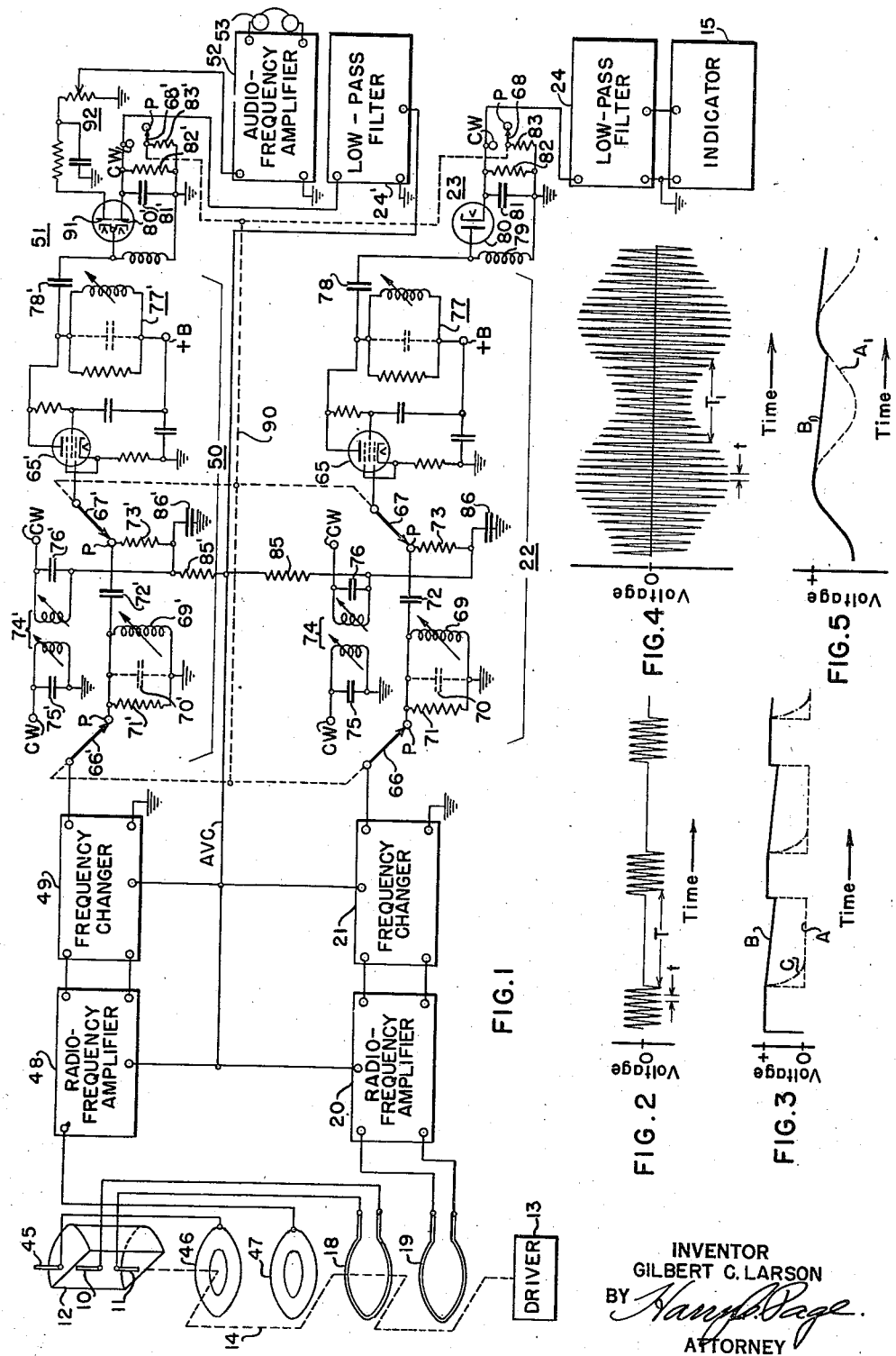
INVENTOR
GILBERT C. LARSON
BY
ATTORNEY Patented Aug. 5, 1947

2,425,102

UNITED STATES PATENT OFFICE 2,425,102

RADIANT-ENERGY RECEIVER

Gilbert C. Larson, Bayside, N. Y., assignor, by mesne assignments, to Hazeltine Research, Inc., Chicago, Ill., a corporation of Illinois Application September 20, 1943, Serial No. 503,045

5 Claims. (Cl. 250—11)

This invention relates, in general, to a receiver for receiving a periodic radiant-energy signal and is particularly directed to a receiver for receiving a periodic radiant-energy signal having pulse-wave amplitude variations such that the signal has a reduced amplitude for intervals which are long with reference to the period of the signal. A receiver of this type is especially suited for inclusion in a radiant-energy signal direction-finder system and it will be described in that connection.

Prior art direction-finder systems generally comprise an antenna system having a directional pattern such that its response characteristic is determined by its orientation with reference to the direction of the source of a radiant-energy signal being received. A receiver may be coupled to such an antenna system to receive the radiated signal intercepted thereby and to derive, by rectification, an output signal having an amplitude characteristic determined by the relative orientation of the antenna system with reference to the source of the received signal. Such an output signal is suitable for controlling an indicating device to produce, for example, a visual indication of the direction of reception, or bearing, of the received signal. A direction-finder system of the type under consideration forms the subject matter of copending application Serial No. 423,514, filed December 18, 1941, now Patent No. 2,407,281, issued Sept. 10, 1946, in the names of John Kelly, Johnson et al.

Such direction-finder systems perform most satisfactorily to provide accurate bearing indications for received signals of substantially constant amplitude or amplitude-modulated signals of the broadcast type, but operate less efficiently when receiving a radiated periodic signal of pulse-wave form having a comparatively low average energy content as, for example, a periodic signal of rectangular-wave form. This reduced efficiency is due primarily to operating limitations of the receiver conventionally used in such prior art arrangements. Frequently, the receiver is of the superheterodyne type customarily utilized in commercial broadcast reception which lacks the pass-band and time-constant characteristics required efficiently to derive direction-finder signals in response to received periodic signals of pulse-wave form.

As employed throughout this specification and in the appended claims, the expression "periodic signal of pulse-wave form" is intended to mean a periodic carrier signal having pulse-wave amplitude variations such that the signal has a considerably reduced amplitude for intervals which are long with reference to the period of the carrier signal.

It is, therefore, an object of the invention to provide an improved receiver suitable for use in a direction-finder system which is not subject to the above-mentioned limitations of prior art arrangements.

It is another object of the invention to provide an improved receiver for receiving a periodic radiant-energy signal having pulse-wave amplitude variations such that the signal has a reduced amplitude for intervals which are long with reference to the period of the signal.

In accordance with the invention, a receiver for receiving a first periodic radiant-energy signal having pulse-wave amplitude variations such that the signal has a reduced amplitude for intervals which are long with reference to the period of the signal and for receiving a second periodic radiant-energy signal comprises a pick-up system for the signals and receiving means coupled to the pick-up system for translating the signals. The receiving means includes rectifying means, a first load circuit for the rectifying means having a time constant which is long with reference to the aforesaid intervals of the first signal and a second load circuit for the rectifying means having a time constant which is short with reference to that of the first load circuit and long with reference to the period of the second signal. The receiver includes means for selectively connecting in the circuit of the receiver the first load circuit to translate the first signal or the second load circuit to translate a second signal. Additional means are provided for utilizing an output signal derived from the effective load circuit.

For a better understanding of the present invention, together with other and further objects thereof, reference is had to the following description taken in connection with the accompanying drawing, and its scope will be pointed out in the appended claims.

Referring to the drawing, Fig. 1 is a schematic circuit diagram of a radiant-energy signal direction-finder system including a receiver in accordance with the invention; and Figs. 2–5, inclusive, are graphs utilized in explaining the operation of the receiver included in the direction-finder system of Fig. 1.

Referring now more particularly to Fig. 1 of the drawing, the radiant-energy signal direction-finder system there represented is generally similar to that disclosed in Fig. 1 of the aforementioned application of Johnson et al. but is modified to include a receiver in accordance with the present invention. The direction-finder system comprises a receiving pick-up or antenna system having a directive pattern, that is to say, having a response characteristic determined by its orientation with reference to the direction of the source of a received radiant-energy signal. This pick-up system is provided by a dipole antenna 10, 11 and a reflector 12. A driver 13, mechanically coupled as indicated by the broken line 14 to the pick-up system 10, 11 and its associated reflector 12, provides means for rotating the pick-up system thereby effectively to rotate its directive pattern.

The signal output of pick-up system 10, 11 is applied to a receiving means coupled thereto through a pair of inductively-coupled loops 18 and 19, loop 19 being stationary and loop 18 being driven, as indicated by the broken line 14, with the pick-up system and its associated reflector. The receiving means comprise, in cascade, a radio-frequency amplifier 20 of one or more stages, a frequency changer or oscillator-modulator 21, an intermediate-frequency amplifier 22, and a rectifier or detector 23. Elements 20 and 21 may be of any well-known design but elements 22 and 23, to be described more fully hereinafter, are constructed in accordance with the invention so that this receiving means in combination with the described pick-up system provides a new receiver for receiving a periodic radiant-energy signal of pulse-wave form. The output signal of detector 23 is applied to a utilizing means, such as an indicator 15, by way of a low-pass filter 24 of conventional design.

Inasmuch as the pick-up system 10, 11 has a directive pattern the orientation of which varies relative to the direction of reception of a desired signal, the amplitude of the signal translated by units 20–23, inclusive, varies in accordance with this relative orientation and also in accordance with the average field strength of the radiant-energy signal being received. In order to eliminate such amplitude variations as are caused by variations of the average field strength of the received signal, a control system is provided for the receiving means comprised of units 20–23, inclusive. This control system includes a second pick-up or antenna system 45 having a radiation pattern which is less directive than that of the first pick-up system 10, 11 and being preferably nondirective, means coupled with the second antenna system 45 for deriving a control effect which varies primarily in accordance with the average field strength of the received signal, and means for utilizing the derived control effect to adjust an operating characteristic of the receiving means including units 20–23, inclusive. As illustrated in the drawing, antenna system 45 comprises a vertical conductor mounted on reflector 12, adapted to be rotated therewith, and capacitively coupled through a rotating plate 46 and a stationary plate 47 to the input circuit of a receiver. This last-named receiver comprises, in cascade, a radio-frequency amplifier 48 of one or more stages, a frequency changer or oscillator-modulator 49, an intermediate-frequency amplifier 50, a detector and automatic volume control or A. V. C. rectifier 51, an audio-frequency amplifier 52 of one or more stages, and a sound-signal reproducing device 53. A voltage from the A. V. C. rectifier in unit 51 is applied through a low-pass filter 24', which removes undesired modulation components therefrom, to one or more of the tubes of stages 48, 49 and 50 to maintain the amplitude of the signal input to detector 51 within a relatively narrow range for a wide range of variations of the average field strength of the received signal. Additionally, the A. V. C. rectifier in unit 51 is utilized to control the gain of stages 20, 21 and 22 to maintain the amplitude of the signal input to detector 23 within a relatively narrow range for a wide range of variations of the average field strength of the radiant-energy signal being received. This last-described receiver is like that comprising units 20–23 in that the elements thereof illustrated by block diagrams may be of any conventional construction, while elements 50 and 51, which will be described more fully hereinafter, are constructed substantially as units 22 and 23, respectively, thereby to provide a new receiver in accordance with the present invention.

Neglecting for a moment the details of units 22, 23, 50, and 51, it will be seen that the described radiant-energy signal direction-finder system is generally similar to that disclosed in Fig. 1 of the above-identified Johnson et al. application and corresponding components thereof are designated by like reference characters. In this connection, however, it should be noted that indicator 15, in a system of the Johnson et al. type, is intended to include not only a line-tracing device but also means for synchronizing the line-tracing device with the rotation of the directive pattern, means responsive to the amplitude of a signal received by the pick-up system for shifting the line traced by the device in accordance therewith to trace the directive pattern of the pick-up system, and means for cyclically displacing the line traced by the device at a frequency which is high with respect to the frequency at which the directive pattern is rotated to trace intersecting lines sharply indicative of the direction of reception of the received signal. However, it is not necessary to use an indicator 15 of this type in the present invention and, in the simplest case in which driver 13 comprises a wheel so that the antenna system can be manually rotated, indicator 15 may be a voltmeter. The operation of the direction-finder system, as a whole, in producing a sharp and unambiguous indication of the direction of reception, or bearing, of a received radiant-energy signal is fully described in the Johnson et al. application and reference may be had thereto for the operating details. In brief, the operation is as follows.

Driver 13 rotates antenna system 10, 11 preferably at a predetermined frequency and means, included in line-tracing device 15, cause the device to trace a circular path in synchronism with the antenna rotation. A radiant-energy signal intercepted by the antenna system in such rotation is translated through the receiver comprising units 20–24, inclusive. The output signal thus produced in unit 24 is a unidirectional potential having amplitude variations which represent the antenna directive pattern with reference to the direction of reception, or bearing, of the received signal. This output signal is utilized to modulate the radius of the circular path traced by line-tracing device 15, thereby to cause the device to trace the antenna directive pattern. During this operation of unit 15, the line traced thereby is displaced cyclically at a frequency which is high with reference to the antenna rotation, whereby overlapping directive patterns are traced. The intersections of such patterns with reference to a suitable compass scale provided for unit 15 accurately determine the bearing of the received signal.

Inasmuch as the present invention is directed to the receiver portion of the direction-finder system for producing a signal output which varies in accordance with the orientation of the pick-up system with reference to the direction of reception of received radiant-energy signals, as distinguished from the operation of the bearing indicator, the remainder of this description is limited to the features and operation of the receiver.

Referring now more particularly to the first-described receiver, the intermediate-frequency amplifier 22 thereof is represented, for convenience of illustration, as comprising a single stage, but it may include as many stages as desired. As shown, this stage includes a vacuum-tube amplifier 65 having an input circuit coupled to the output terminals of frequency changer 21. Two-position switches 66, 67 included in the amplifier input circuit provide means for selectively connecting a first selector or a second selector in the input circuit of the amplifier. The first selector is connected to terminal P of switch 66 and comprises an adjustable inductor 69 tuned to the intermediate frequency of the receiver by means of a condenser 70, shown in dotted lines, since it may be formed in whole or in part of the distributed capacitance of the inductor and its associated circuits. The selector is damped by a resistor 71 to have a relatively wide pass-band characteristic. A coupling condenser 72 and leak resistor 73 couple the first selector to terminal P of switch 67.

The second selector, which is sharply tuned to the intermediate frequency of the receiver so as to have a pass-band characteristic which is narrow with reference to that of the first selector, is connected between terminals CW of switches 66 and 67. It is constituted of a transformer 74 double-tuned by condensers 75, 76.

The aforedescribed A. V. C. control potential is applied from the conductor indicated A. V. C. to the control electrode of tube 65 by way of resistor 85, a portion of the effective selector circuit, and switch 67. Condenser 86 is an intermediate-frequency by-pass condenser for isolating the intermediate-frequency signals from the A. V. C. circuits. The output circuit of the intermediate-frequency amplifier includes a broadly-tuned circuit 77 having substantially the same design as the selector comprised of elements 69, 70, and 71. Operating potentials are supplied to the amplifier 65 in a conventional manner from a source indicated as +B.

The output circuit of intermediate-frequency amplifier 22 is coupled to detector 23 through a condenser 78. This detector is of the peak rectifier type and comprises a diode 80 having a first load circuit including a condenser 81 and a resistor 82 and a second load circuit comprising condenser 81 and resistors 82 and 83 in parallel. A low-resistance choke 79 completes the circuit of rectifier 80 and in conjunction therewith provides a short time constant for charging condenser 81, defined more particularly hereinafter. Resistors 82 and 83 are so chosen as to cause the load circuits of the rectifying device to have long discharge time constants related to each other and to the period of a received signal, as described more fully hereinafter. A two-position switch 68 comprises means for selectively coupling the first and second load circuits to the rectifying device. With the switch in position P, the first-described load circuit is effective while the second-described load circuit is effective when the switch is in its alternate position, indicated CW.

Switches 66, 67 and 68 have a mechanical interconnection, represented by broken line 90, which interconnection serves as a unicontrol means for simultaneously operating the several switches, thereby selectively to connect in the receiver circuit the first selector and the first load circuit of rectifier 80 to translate a first signal or the second selector and second load circuit of the rectifier for translating a second signal.

It will be apparent that the receiver under consideration effectively includes two intermediate-frequency channels, the first including the first selector, intermediate-frequency amplifier 65, rectifying diode 80 and its first load circuit, and the other including the second selector, intermediate-frequency amplifier 65, rectifying device 80 and its second load circuit. Due to the pass-band characteristics of the first and second selectors and the time constants of the first and second load circuits of rectifying device 80, these channels have different operating characteristics. This feature enables the receiver efficiently to translate received periodic radiant-energy signals of widely varying wave forms. More specifically, this feature enables the receiver to translate efficiently and without appreciable distortion a periodic continuous-wave signal of substantially constant amplitude, a periodic signal having pulse-wave amplitude variations such that the signal has substantially zero amplitude for intervals which are long with reference to the period of the signal, and periodic signals having amplitude variations of intermediate wave forms.

In considering the operation of the receiver, it will be assumed that a first periodic radiant-energy signal of rectangular wave form is intercepted by pick-up system 10, 11. This received signal after amplification in radio-frequency amplifier 20 is heterodyned to an intermediate-frequency signal in frequency changer 21 and supplied to intermediate-frequency amplifier 22 with a wave form of the type illustrated by the curve of Fig. 2. The signal has a carrier period t and has substantially zero amplitude for intervals T which are long with respect to the carrier period of the signal. Such a signal has a relatively large number of frequency components within a predetermined band of frequencies determined by the frequency of the carrier signal, the fundamental frequency of the recurring pulses, and harmonics of the fundamental pulse frequency.

In order to translate a signal of this type through the receiver, unicontrol means 90 is actuated to place switches 66, 67 and 68 in positions P, as illustrated in the drawing. This operation of the unicontrol means couples the first selector and the first load circuit to rectifying device 80 and thereby connects the first-described intermediate-frequency channel in the circuit of the receiver. The first selector is constructed to have a frequency-response characteristic effective to pass a band of frequencies of the same order of magnitude as the band of frequency components contained in the received signal and causes the receiver to have a similar frequency-response characteristic, assuming the pass-band characteristic of radio-frequency amplifier 20 to be at least as wide as that of the first selector. Rectifier 80 and choke 79, preferably, cause the charging time constant of condenser 81 to be short with reference to the duration of the pulses of the received signal. However, resistor 82 is so chosen that the first load circuit of rectifying device 80 has a discharge time constant which is long not only with respect to the carrier period $t$ of the received signal but also with respect to the intervals T during which the received signal has substantially zero amplitude. Also, this discharge time constant is selected to be short with reference to the period corresponding to the frequency of rotation of antenna system 10, 11 in order that the detected signal may follow the amplitude variations of the received signal in response to the rotation of the antenna directive pattern. Accordingly, rectifying device 80, through rectification of the first pulse of the received signal, charges condenser 81 substantially to the peak value thereof. This charge decays very slowly during the interval T so that when the next succeeding pulse of the received signal is applied to the rectifier, the condenser has lost but a small amount of its initial charge. This second pulse is peak-rectified to restore the charge on the condenser 81 to its peak value. In like manner, succeeding pulses of the received signal are peak-rectified and an output signal is derived in the rectifier load circuit which substantially represents the peak value of the received pulses. This output signal is represented by curve B of Fig. 3 in which dotted curve A represents one-half of the envelope of the received signal.

It will be understood that the rotation of pick-up system 10, 11, which has a directional characteristic, causes the succeeding pulses of the received signal to have peak values determined by the orientation of the pick-up system with reference to the direction of the source of the received signal. Thus, it will be clear that the output signal derived in the effective load circuit of rectifier 80 varies in accordance with the orientation of the pick-up system with reference to the direction of the signal source. Low-pass filter 24, which rejects the pulse-modulation components of the received signal, applies the derived output signal to the indicator 15 for utilization.

Curve C of Fig. 3 represents the output signal derived in a conventional receiver in response to a received periodic signal having a modulation wave form of the type illustrated by the curve of Fig. 2, assuming such receiver to have a pass band sufficiently wide to translate the received signal without appreciable distortion. It will be noted that this output signal falls off at a rapid rate during the intervals T so that shortly after the termination of each rectifier pulse the output signal is reduced substantially to zero value. This result is caused primarily by virtue of the fact that the discharge time constant of the rectifier load circuit in a conventional receiver is selected to be long with reference to the carrier period of the received signal but short with reference to the modulation components to enable the derived signal to have a wave form corresponding to that of the rectified signal. Such an output signal is not as suited for controlling the indicating mechanism of a direction-finder system as that represented by curve B of Fig. 3 which is obtained with a receiver in accordance with the present invention.

Assume now that a second periodic radiant-energy signal is intercepted by pick-up system 10, 11 having a modulation envelope as represented by the curve of Fig. 4. This signal may be a continuous-wave signal having a carrier period $t$ and amplitude-modulated by a constant-frequency modulating signal of relatively low frequency. Such a signal has a reduced amplitude for intervals $T_1$ which are long with reference to the period $t$ and contains frequency components within a predetermined band of frequencies determined by the frequency of the carrier signal and the frequency of the modulating signal. With switches 66, 67 and 68 in the position shown in Fig. 1, that is, with the first intermediate-frequency channel effective, this received signal is peak-rectified in a manner already described to derive an output signal in the effective load circuit of rectifying device 80 as shown by curve $B_1$ of Fig. 5 where dotted curve $A_1$ again represents one-half of the envelope of the received signal. This derived signal is suitable for controlling the indicator 15 and is applied thereto through low-pass filter 24.

It will be apparent from the foregoing description that a receiver in accordance with the invention operates effectively both upon received periodic radiant-energy signals having substantially zero amplitude for intervals which are long with respect to the period of the signal and also upon signals having merely a reduced amplitude for intervals which are long with respect to the period of the signal. Therefore, the foregoing definition of a periodic signal of pulse-wave form is intended to describe signals having modulation wave forms of the type illustrated by the curves of both Figs. 2 and 4.

In order to have a high signal-to-noise ratio and thus maximum receiver response, it is desirable that the pass-band characteristic of the receiver be no wider than is necessary to include the band of frequency components contained in the received signal. Also, it is desirable that the time constant of the rectifier load circuit be no longer than required to provide the desired output signal in order that transient disturbances in the received signal may not paralyze the desired receiver response. In discussing the receiver operation thus far, only the first-described intermediate-frequency channel has been considered. This channel is characterized by a wide pass band and by a rectifier load circuit having an unusually long time constant. While both of these features are desirable for efficient translation of received periodic signals of rectangular wave form, they tend to limit most efficient receiver operation in response to the second-described signal, namely, a signal having a modulation wave form of the type illustrated by the curve of Fig. 4. The reasons for this are, first, the frequency band including the components of such a signal is narrow with reference to the band width of the first channel, resulting in a poor signal-to-noise ratio, and, second, the discharge time constant of the rectifier load circuit in this channel is considerably longer than required to derive a satisfactory output in response to such a signal. Therefore, it is contemplated by the invention to utilize the second intermediate-frequency channel when receiving such signals. To this end, unicontrol means 90 are actuated, moving switches 66, 67, 68 to positions CW, thereby to couple the second selector and second load circuit to rectifying device 80.

The second selector has a frequency-response characteristic effective to pass a band of frequencies of the same order of magnitude as the band which includes the frequency components of the second-described signal. The second load circuit of rectifier device 80 is designed to have a discharge time constant which is short with reference to that of the first load circuit and which is long with reference to the carrier period of the second signal. Preferably, this time constant should be short with reference to the fundamental modulation component of the second signal so that detector 80 and its load circuit derive the modulation components thereof. The low-pass filter 24, in the case under consideration and also in the case already discussed, is effective to derive from the rectifier load circuit a unidirectional potential which varies in accordance with the orientation of the pick-up system 10, 11 with reference to the direction of the source. The derived unidirectional potential is applied to indicator 15 to produce the desired bearing indication, as explained above.

It will be clear without further elaboration that the receiver is equally effective to translate a periodic continuous-wave signal having substantially no amplitude variations. While either intermediate-frequency channel may be utilized for the translation of such a signal, it is preferred to use the second channel which has a relatively narrow pass band and, consequently, an improved signal-to-noise ratio.

As illustrative of a specific embodiment of the invention, the following circuit constants are given for an embodiment of the type shown in Fig. 1:

| | |
|---|---|
| Vacuum tube 65 | Type 6SH7 |
| Rectifier device 80 | Type 6H6 |
| Rectifier device 80', 91 | Type 6H6 |
| Resistor 71 | 2,000 ohms |
| Resistor 73 | 100,000 ohms |
| Choke 79 | 30 microhenries |
| Resistor 82 | 10 megohms |
| Resistor 83 | 25,000 ohms |
| Condenser 70 | 25 micro-microfarads |
| Condenser 72 | 100 micro-microfarads |
| Condenser 75 | 20 micro-microfarads |
| Condenser 76 | 20 micro-microfarads |
| Condenser 81 | 50 micro-microfarads |
| Inductor 69 | 12 microhenries |
| Self-inductance of windings of transformer 74 | 9 microhenries |
| Mutual inductance of windings of transformer 74 | .09 microhenries |
| Intermediate frequency | 9.0 megacycles |

The second-described receiver, provided for obtaining an A. V. C. control potential, receives the same signals as those applied to the receiver of the direction-finder channel. Consequently, the intermediate-frequency amplifier of the second receiver is constructed to be identical with intermediate-frequency amplifier 22 and similar elements thereof bear like reference numerals primed. Detector 51 of the second receiver is likewise constructed in a manner substantially identical with that of detector 23 and like elements thereof bear like reference numerals primed. It should be noted, however, that detector 51 includes an audio-frequency detector for monitoring purposes as well as the A. V. C. rectifier 80'. The audio detector 91 is one section of a duo-diode, the other section of which comprises rectifying device 80'. The audio detector has a conventional load circuit 92 in which the modulation components are derived for application to the audio-frequency amplifier and reproduction in the sound reproducer 53. Switches 66', 67' and 68' of the second-named receiver are coupled to unicontrol means 90, whereby the operating characteristics of both receivers may be simultaneously controlled.

It will be understood that the circuit design and construction of the first and second selectors is immaterial so long as the aforedescribed passband characteristics are provided. Those disclosed in the drawing merely represent a preferred selection and are not to be construed as a limitation on the receiver of the invention.

Further, it will be understood that in place of antenna system 10, 11 a pick-up system may be utilized which is capable of receiving periodic sound or light signals and the phrase "a receiver for receiving a periodic radiant-energy signal" is intended to include such other applications.

It is preferred that the rectifying means comprised of units 79–82, inclusive, have such a short charging time constant that condenser 81 becomes almost completely charged with each peak of the applied pulses. However, it will be understood that the invention will operate substantially as described even though this charging time constant be somewhat longer; for example, the condenser in some applications may be charged to only a small fraction of the peak value of the applied pulses and the term "peak-rectifying means" is intended to include apparatus of either type.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A receiver for receiving a first periodic radiant-energy signal having pulse-wave amplitude variations such that said signal has a reduced amplitude for intervals which are long with reference to the period of said signal and for receiving a second periodic radiant-energy signal comprising, a pick-up system for said signals, receiving means coupled to said pick-up system for translating said signals, rectifying means included in said receiving means, a first load circuit for said rectifying means having a time constant which is long with reference to said intervals of said first signal, a second load circuit for said rectifying means having a time constant which is short with reference to that of said first load circuit and long with reference to the period of said second signal, means for selectively connecting in the circuit of said receiver said first load circuit to translate said first signal or said second load circuit to translate said second signal, and means for utilizing an output signal derived from the effective load circuit.

2. A receiver for receiving a first periodic radiant-energy signal having components within a first predetermined band of frequencies and pulse-wave amplitude variations such that said signal has a reduced amplitude for intervals which are long with reference to the period of said signal and for receiving a second periodic radiant-energy signal having components within a second predetermined band of frequencies comprising, a pick-up system for said signals, receiving means coupled to said pick-up system for translating said signals, a first selector for said receiving means having a frequency-response characteristic effective to pass a band of frequencies of the same order of magnitude as said first predetermined band, a second selector for said receiving means having a frequency-response characteristic effective to pass a band of frequencies of the same order of magnitude as said second predetermined band, rectifying means included in said receiving means, a first load circuit for said rectifying means having a time constant which is long with reference to said intervals of said first signal, a second load circuit for said rectifying means having a time constant which is short with reference to that of said first load circuit and long with reference to the period of said second signal, means for selectively connecting in the circuit of said receiver said first selector and said first load circuit to translate said first signal or said second selector and said second load circuit to translate said second signal, and means for utilizing an output signal derived from the effective load circuit.

3. A receiver for receiving a first periodic radiant-energy signal having components within a first predetermined band of frequencies and pulse-wave amplitude variations such that said signal has a reduced amplitude for intervals which are long with reference to the period of said signal and for receiving a second periodic radiant-energy signal having components within a second predetermined band of frequencies comprising, a pick-up system for said signals, receiving means coupled to said pick-up system for translating said signals, a first selector for said receiving means having a frequency-response characteristic effective to pass a band of frequencies of the same order of magnitude as said first predetermined band, a second selector for said receiving means having a frequency-response characteristic effective to pass a band of frequencies of the same order of magnitude as said second predetermined band, rectifying means included in said receiving means, a first load circuit for said rectifying means having a time constant which is long with reference to said intervals of said first signal, a second load circuit for said rectifying means having a time constant which is short with reference to that of said first load circuit and long with reference to the period of said second signal, unicontrol means for selectively connecting in the circuit of said receiver said first selector and said first load circuit to translate said first signal or said second selector and said second load circuit to translate said second signal, and means for utilizing an output signal derived from the effective load circuit.

4. A receiver for receiving a first periodic radiant-energy signal having components within a first predetermined band of frequencies and pulse-wave amplitude variations such that said signal has a reduced amplitude for intervals which are long with reference to the period of said signal and for receiving a second periodic radiant-energy signal having components within a second predetermined band of frequencies comprising, a pick-up system for said signals having a response characteristic determined by its orientation with reference to the direction of the source of the signal being picked up, receiving means coupled to said pick-up system for translating said signals, a first selector for said receiving means having a frequency-response characteristic effective to pass a band of frequencies of the same order of magnitude as said first predetermined band, a second selector for said receiving means having a frequency-response characteristic effective to pass a band of frequencies of the same order of magnitude as said second predetermined band, rectifying means included in said receiving means, a first load circuit for said rectifying means having a time constant which is long with reference to said intervals of said first signal, a second load circuit for said rectifying means having a time constant which is short with reference to that of said first load circuit and long with reference to the period of said second signal, unicontrol means for selectively connecting in the circuit of said receiver said first selector and said first load circuit to translate said first signal or said second selector and said second load circuit to translate said second signal, and means for utilizing an output signal derived from the effective load circuit which varies in accordance with the orientation of said pick-up system with reference to the direction of said source.

5. A receiver for receiving a first periodic radiant-energy signal having components within a first predetermined band of frequencies and pulse-wave amplitude variations such that said signal has a reduced amplitude for intervals which are long with reference to the period of said signal and for receiving a second periodic radiant-energy signal having components within a second predetermined band of frequencies comprising, a pick-up system for said signals, receiving means coupled to said pick-up system effectively including two signal-translating channels, one of said channels including a selector having a frequency-response characteristic effective to pass a band of frequencies of the same order of magnitude as said first predetermined band, rectifying means, and a load circuit for said rectifying means having a time constant which is long with reference to said intervals of said first signal, the other of said channels including a selector having a frequency-response characteristic effective to pass a band of frequencies of the same order of magnitude as said second predetermined band, rectifying means, and a load circuit for said rectifying means having a time constant which is short with reference to that of said first-mentioned load circuit and long with reference to the period of said second signal, means for selectively connecting in the circuit of said receiver said one channel to translate said first signal or said other channel to translate said second signal, and means for utilizing an output signal derived from the effective channel.

GILBERT C. LARSON.

REFERENCES CITED

The following references are of record in the file of this patent:

UNITED STATES PATENTS

| Number | Name | Date |
| --- | --- | --- |
| 2,208,349 | Ulbricht | July 16, 1940 |
| 2,248,343 | Elliott | July 8, 1941 |
| 2,110,852 | Blodgett | Mar. 15, 1938 |
| 2,159,159 | Horle | May 23, 1939 |
| 2,179,298 | Manke | Nov. 7, 1939 |